Jan. 27, 1931.　　　　　S. W. CADY　　　　　1,790,089

DEPTH GAUGE FOR TILLAGE DISKS

Filed April 22, 1929

Inventor
Sherman W. Cady
By
Atty.

Patented Jan. 27, 1931

1,790,089

UNITED STATES PATENT OFFICE

SHERMAN W. CADY, OF PERRY, NEW YORK, ASSIGNOR TO INTERNATIONAL HARVESTER COMPANY, A CORPORATION OF NEW JERSEY

DEPTH GAUGE FOR TILLAGE DISKS

Application filed April 22, 1929. Serial No. 356,893.

This invention relates to improvements in depth gauging devices for furrow opening disks, such as employed on grain drills, but the principle of the invention can be applied to tillage disks in general.

The main object of the invention is to provide a depth gauging band for attachment to the face of a disk which will embody in its construction attaching means capable of easy adjustment to vary the circumference of the band to permit changes in the degree of penetration of the disk carrying the gauge band. The invention accordingly resides in the combination and details of construction hereinafter more specifically described and claimed and illustrated in the accompanying drawing, wherein:

Figure 1:
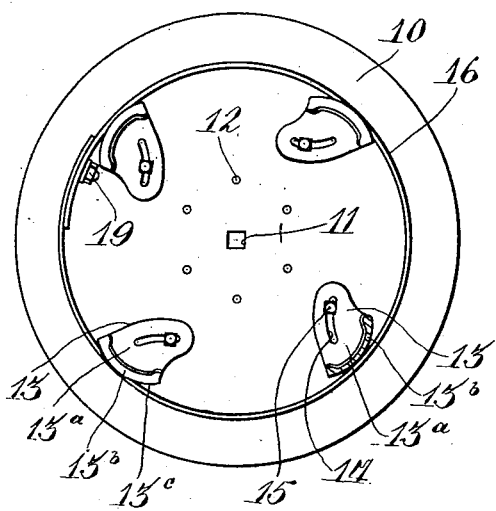
Figure 1 is a face view of a disk with the gauge device secured thereto in one position of adjustment.
Figure 2:
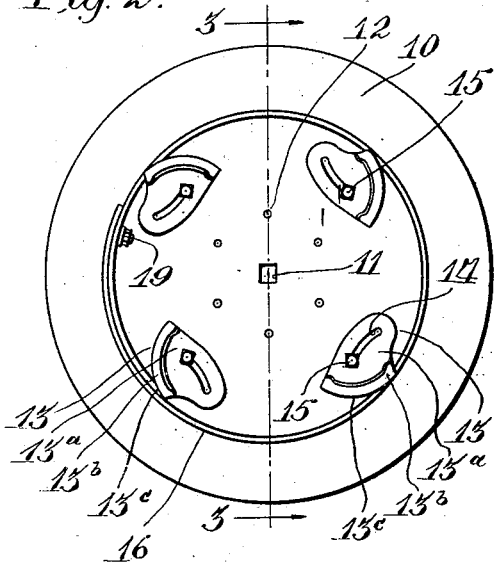
Figure 2 is a similar view with the gauge device in another position of adjustment.
Figure 3:
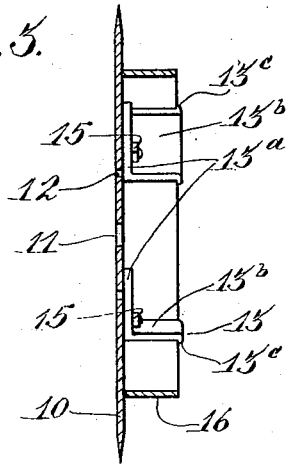
Figure 3 is a vertical section on the line 3—3 of Figure 2.
Figure 4:
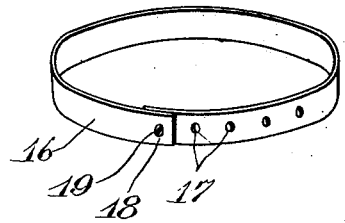
Figure 4 is a perspective view of the gauge band.
Figure 5:
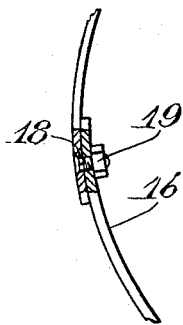
Figure 5 is a detail section of the band showing connecting means for its free ends.

In the present instance the invention is illustrated as embodied in an organization comprising a furrow opening disk 10 having a central axle opening 11 surrounded by a series of bolt openings 12 for the reception of hub bolts. In the practice of the invention, a plurality of bracket members 13 are secured to a face of the disk at circumferentially spaced points on the disk, which in this instance are substantially midway between its axis and periphery. Each bracket member 13 consists of a flat shank portion 13$^a$ and a curved head portion 13$^b$. The head portion 13$^b$ extends at right angles to the shank 13$^a$, and is formed with an upstanding lip or flange 13$^c$ on its free edge. The shank 13$^a$ is slotted in the direction of its length, as at 14, and this slot is preferably curved on a reverse arc intersecting the arc of curvature of the head 13$^b$. A bolt 15, which passes through the disk and is engaged in the slot 14, serves to mount the bracket on the disk face and to clamp the shank thereon, while also permitting radial and angular adjustment of the bracket on the disk in the manner illustrated in Figures 1 and 2, when the bolt is loosened. When in position on the disk face, the brackets provide a series of curved seats or supporting surfaces extending perpendicularly to the face of the disk with the arc of curvature of the seats eccentrically related to the pivot bolts 15. The curved seats or heads 13$^b$ receive a flat, circular gauge band 16, which is drawn up on the seats and retained in position by the marginal flanges 13$^c$. The band 16 is made expansible and contractible, as for instance by means of a series of openings 17 in one end of the band, which can be brought into registration with a corresponding opening 18 in the other end, and through which registered openings a fastening bolt 19 may be passed.

With the construction described a wide range of adjustment of the depth gauge band 16 may be readily obtained, either by radial adjustment of the brackets on the disk or by angular movement thereof about the bolts 15, or by combination of the two movements. A variation of several inches in the depth to which the disk on which the gauge band is mounted may cut into the soil is accordingly made possible through adjustment of the brackets and corresponding contraction or expansion of the gauge band, and the gauge band, when adjusted, will be retained in position at all adjustments of the brackets.

While the foregoing disclosure illustrates a preferred embodiment of the invention, variations in structure may be employed without departure from the scope of the invention as defined in the following claims.

What is claimed is:

1. The combination with a tillage disk of a plurality of bracket members mounted on a face of the disk at circumferentially spaced points around its center and formed with angular extensions perpendicular to the disk face, and a flat circular gauge band seated on said angular extensions.

2. The combination with a tillage disk of a plurality of bracket members supported on a face of the disk at circumferentially spaced points around its center, said members each having a shank portion mounted on the disk for angular adjustment radially and a head portion perpendicular to the disk face and curved on an arc eccentric to the axis of angular adjustment, and an extensible flat band seated on the head portions of said members.

3. The combination with a tillage disk of a plurality of bracket members supported on a face of the disk at circumferentially spaced points around its center, said members each having a slotted shank portion, a securing bolt passing through the disk and slot, a head portion perpendicular to the disk face and curved on an arc eccentric to the axis of the bolt, and an extensible flat band seated on the head portions of said members.

4. The combination with a tillage disk of a plurality of supporting brackets formed with curved faces perpendicular to the disk surface and eccentrically pivoted to a face of the disk at circumferentially spaced points around its center, a retaining flange on the outer edge of the curved face of each bracket, and an extensible band seated on the curved faces within said flanges.

In testimony whereof I affix my signature.

SHERMAN W. CADY.